United States Patent
Daulton et al.

(10) Patent No.: US 12,296,400 B2
(45) Date of Patent: May 13, 2025

(54) ADDITIVELY DEPOSITING MULTIPLE BRAZE MATERIALS

(71) Applicant: Pratt & Whitney Canada Corp., Longueuil (CA)

(72) Inventors: Charles Trent Daulton, Burkburnett, TX (US); Kevin M. Tracy, Wichita Falls, TX (US)

(73) Assignee: Pratt & Whitney Canada Corp., Longueuil (CA)

( * ) Notice: Subject to any disclaimer, the term of this patent is extended or adjusted under 35 U.S.C. 154(b) by 146 days.

(21) Appl. No.: 17/942,072

(22) Filed: Sep. 9, 2022

(65) Prior Publication Data
US 2024/0082938 A1    Mar. 14, 2024

(51) Int. Cl.
*B22F 10/20* (2021.01)
*B23K 1/00* (2006.01)
*B23K 1/008* (2006.01)
*B23P 6/00* (2006.01)
*B33Y 10/00* (2015.01)

(52) U.S. Cl.
CPC ............ *B23K 1/0018* (2013.01); *B22F 10/20* (2021.01); *B23K 1/008* (2013.01); *B23P 6/007* (2013.01); *B33Y 10/00* (2014.12)

(58) Field of Classification Search
None
See application file for complete search history.

(56) References Cited

U.S. PATENT DOCUMENTS

| | | | |
|---|---|---|---|
| 8,140,179 B2 | 3/2012 | Drechsler | |
| 8,910,361 B2 | 12/2014 | Rickenbacher | |
| 9,174,312 B2 | 11/2015 | Baughman | |
| 9,505,172 B2 | 11/2016 | Ljungblad | |
| 9,764,517 B2 | 9/2017 | Potter | |
| 9,902,024 B2 | 2/2018 | Ernst | |
| 10,174,414 B2 | 1/2019 | Lin et al. | |
| 10,384,285 B2 * | 8/2019 | Bruck | B23K 1/0018 |

(Continued)

FOREIGN PATENT DOCUMENTS

| | | |
|---|---|---|
| DE | 102017204507 A1 | 9/2018 |
| EP | 3933527 A1 | 1/2022 |

(Continued)

OTHER PUBLICATIONS

EP Search Report for EP Patent Application No. 23196229.1 dated Jan. 5, 2024.

*Primary Examiner* — Devang R Patel
(74) *Attorney, Agent, or Firm* — Getz Balich LLC (57) ABSTRACT

A method is provided during which first braze powder is deposited with a substrate. The first braze powder is sintered to the substrate during the depositing of the first braze powder to provide the substrate with sintered first braze material. Second braze powder is deposited with the substrate. The second braze powder is different than the first braze powder. The second braze powder is sintered to the substrate during the depositing of the second braze powder to provide the substrate with sintered second braze material. The sintered first braze material and the sintered second braze material are heated to melt the sintered first braze material and the sintered second braze material and to diffusion bond the sintered first braze material and the sintered second braze material to the substrate.

18 Claims, 4 Drawing Sheets

(56) References Cited

U.S. PATENT DOCUMENTS

| | | |
|---|---|---|
| 10,814,439 B2 | 10/2020 | Ozturk |
| 11,097,350 B2 | 8/2021 | Twelves, Jr. |
| 11,285,538 B2 | 3/2022 | Shi |
| 11,305,353 B2 | 4/2022 | Geisen |
| 11,305,363 B2 * | 4/2022 | Xu .................. B23K 35/3046 |
| 2006/0163323 A1 | 7/2006 | Pietruska |
| 2007/0228108 A1 | 10/2007 | Goldschmidt |
| 2008/0029500 A1 * | 2/2008 | Malley ................ B23K 1/0018 |
| | | 219/121.64 |
| 2009/0026182 A1 | 1/2009 | Hu |
| 2013/0316183 A1 * | 11/2013 | Kulkarni, Jr. ...... B23K 15/0093 |
| | | 427/532 |
| 2015/0217415 A1 | 8/2015 | Andolfi |
| 2016/0354842 A1 * | 12/2016 | Schick .................. B33Y 10/00 |
| 2018/0243866 A1 * | 8/2018 | Srinivasan ................ F01D 9/04 |
| 2018/0281125 A1 | 10/2018 | Burbaum |
| 2019/0299290 A1 | 10/2019 | Kuhns et al. |
| 2021/0069832 A1 * | 3/2021 | Burbaum ............. B23K 1/0018 |
| 2021/0299802 A1 | 9/2021 | Shin |
| 2022/0212396 A1 | 7/2022 | Tardif |
| 2022/0212397 A1 | 7/2022 | Edy |
| 2022/0226893 A1 * | 7/2022 | Ozbaysal ................ B22F 1/105 |

FOREIGN PATENT DOCUMENTS

| | | | |
|---|---|---|---|
| FR | 3103401 A1 * | 5/2021 | ............. B22F 10/00 |
| FR | 3103401 B1 | 7/2023 | |
| JP | 2009025119 A | 2/2009 | |
| WO | 2015161980 A1 | 10/2015 | |
| WO | 2019177607 A1 | 9/2019 | |

* cited by examiner

ADDITIVELY DEPOSITING MULTIPLE BRAZE MATERIALS

TECHNICAL FIELD

This disclosure relates generally to manufacturing a component using additive manufacturing.

BACKGROUND INFORMATION

Defects in a component may be repaired using braze filler material or weld filler. Various processes are known in the art for applying braze filler material and for welding filler material to a component. While these known processes have various advantages, there is still room in the art for improvement. In particular, there is a need in the art for repair processes which can reduce material waste and/or decrease formation of secondary (process related) defects in a substrate of the component.

SUMMARY

According to an aspect of the present disclosure, a method is provided during which first braze powder is deposited with a substrate. The first braze powder is sintered to the substrate during the depositing of the first braze powder to provide the substrate with sintered first braze material. Second braze powder is deposited with the substrate. The second braze powder is different than the first braze powder. The second braze powder is sintered to the substrate during the depositing of the second braze powder to provide the substrate with sintered second braze material. The sintered first braze material and the sintered second braze material are heated to melt the sintered first braze material and the sintered second braze material and to diffusion bond the sintered first braze material and the sintered second braze material to the substrate.

According to another aspect of the present disclosure, another method is provided during which an additive manufacturing device is provided. The additive manufacturing device includes a first reservoir and a second reservoir. The first reservoir contains a first braze powder. The second reservoir contains a second braze powder that is different than the first braze powder. The first braze powder is deposited with a substrate using the additive manufacturing device. The first braze powder is sintered to the substrate during the depositing of the first braze powder to provide the substrate with a sintered first braze material. The second braze powder is deposited with the substrate using the additive manufacturing device. The second braze powder is sintered to the substrate during the depositing of the second braze powder to provide the substrate with a sintered second braze material.

According to still another aspect of the present disclosure, a system is provided for repairing a component that includes a substrate. This system includes an additive manufacturing device and a furnace. The additive manufacturing device includes a first reservoir, a second reservoir and an energy beam source. The additive manufacturing device is configured to direct a first braze powder from the first reservoir onto the substrate and sinter the first braze powder to the substrate using an energy beam generated by the energy beam source to provide a sintered first braze material. The additive manufacturing device is also configured to direct a second braze powder from the second reservoir onto the substrate and sinter the second braze powder to the substrate using the energy beam generated by the energy beam source to provide a sintered second braze material. The furnace is configured to receive the substrate and melt the sintered first braze material and the sinter second braze material to facilitate diffusion bonding of the sintered first braze material and the sintered second braze material to the substrate.

The method may also include heating the sintered first braze material and the sintered second braze material in a vacuum furnace to melt the sintered first braze material and the sintered second braze material and to diffusion bond the sintered first braze material and the sintered second braze material to the substrate.

The additive manufacturing device may also include a nozzle. The first braze powder may be directed from the first reservoir, through the nozzle, to the substrate during the depositing of the first braze powder. The second braze powder may be directed from the second reservoir, through the nozzle, to the substrate during the depositing of the second braze powder.

The sintered first braze material may fill a void in the substrate. The sintered second braze material may form a cladding on the substrate.

The first braze powder may be deposited with the substrate to fill a void in the substrate. The second braze powder may be deposited with the substrate to form a cladding on the substrate.

The first braze powder may be deposited with the substrate to repair a first type of defect of the substrate. The second braze powder may be deposited with the substrate to repair a second type of defect of the substrate that is different than the first type of defect.

The first braze powder may include metal alloy powder and braze material powder with a lower melting point than the metal alloy powder.

The first braze powder may have a first ratio of the metal alloy powder to the braze material powder. The second braze powder may include the metal alloy powder and the braze material powder. The second braze powder may have a second ratio of the metal alloy powder to the braze material powder. The second ratio may be different than the first ratio.

The first braze powder may be deposited with the substrate to fill a void in the substrate. The second braze powder may be deposited with the substrate to form a cladding on the substrate. The second ratio may be greater than the first ratio.

The metal alloy powder and the substrate may be or include a common metal alloy.

The first braze powder and the second braze powder may be deposited with the substrate using an additive manufacturing device.

The depositing of the first braze powder may include: directing the first braze powder towards the substrate through a nozzle; and sintering the first braze powder using a laser beam.

The depositing of the second braze powder may include: directing the second braze powder towards the substrate through the nozzle; and sintering the second braze powder using the laser beam.

The method may also include: selectively directing the first braze powder from a first reservoir to the nozzle during the depositing of the first braze powder; and selectively directing the second braze powder from a second reservoir to the nozzle during the depositing of the second braze powder.

The laser beam may be directed towards the substrate through an inner bore of the nozzle.

A laser beam may sinter the first braze powder to the substrate as the first braze powder is deposited with the substrate. The laser beam may sinter the second braze powder to the substrate as the second braze powder is deposited with the substrate.

The heating of the sintered first braze material and the sintered second braze material may be performed in a vacuum furnace subsequent to the depositing of the first braze powder and the second braze powder.

The substrate may be part of a stationary component of a gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

The present disclosure includes systems and methods for manufacturing a component. Herein, the term "manufacturing" may describe a process for forming the component; e.g., creating a brand new component. The term "manufacturing" may also or alternatively describe a process for repairing the component; e.g., restoring one or more features of a previously formed component to brand new condition, similar to brand new condition or better than brand new condition. The component, for example, may be repaired to fix one or more defects (e.g., cracks, wear and/or other damage) imparted during previous use of the component. The component may also or alternatively be repaired to fix one or more defects imparted during the initial formation of the component. For ease of description, however, the manufacturing systems and methods may be described below with respect to repairing the component.

The component may be any stationary component within a hot section of the gas turbine engine; e.g., a combustor section, a turbine section or an exhaust section. Examples of the stationary component include, but are not limited to, a vane, a platform, a gas path wall, a liner and a shroud. The present disclosure, however, is not limited to stationary component applications. The engine component, for example, may alternatively be a rotor blade; e.g., a turbine blade. The present disclosure is also not limited to hot section engine components. For ease of description, however, the manufacturing systems and methods may be described below with respect to repairing a gas turbine engine component such as a turbine vane or other stators within the turbine section.

The component may be included in various gas turbine engines. The component, for example, may be included in a geared gas turbine engine where a gear train connects one or more shafts to one or more rotors in a fan section, a compressor section and/or any other engine section. Alternatively, the component may be included in a direct-drive gas turbine engine configured without a gear train. The component may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine. The gas turbine engine may alternatively be configured as an auxiliary power unit (APU) or an industrial gas turbine engine. The present disclosure therefore is not limited to any particular types or configurations of gas turbine engines. Furthermore, it is contemplated the manufacturing systems and methods of the present disclosure may alternatively be used to manufacture component(s) for non-gas turbine engine applications; e.g., for reciprocating piston internal combustion engine applications, for rotary internal combustion engine applications, etc.

Figure 1:
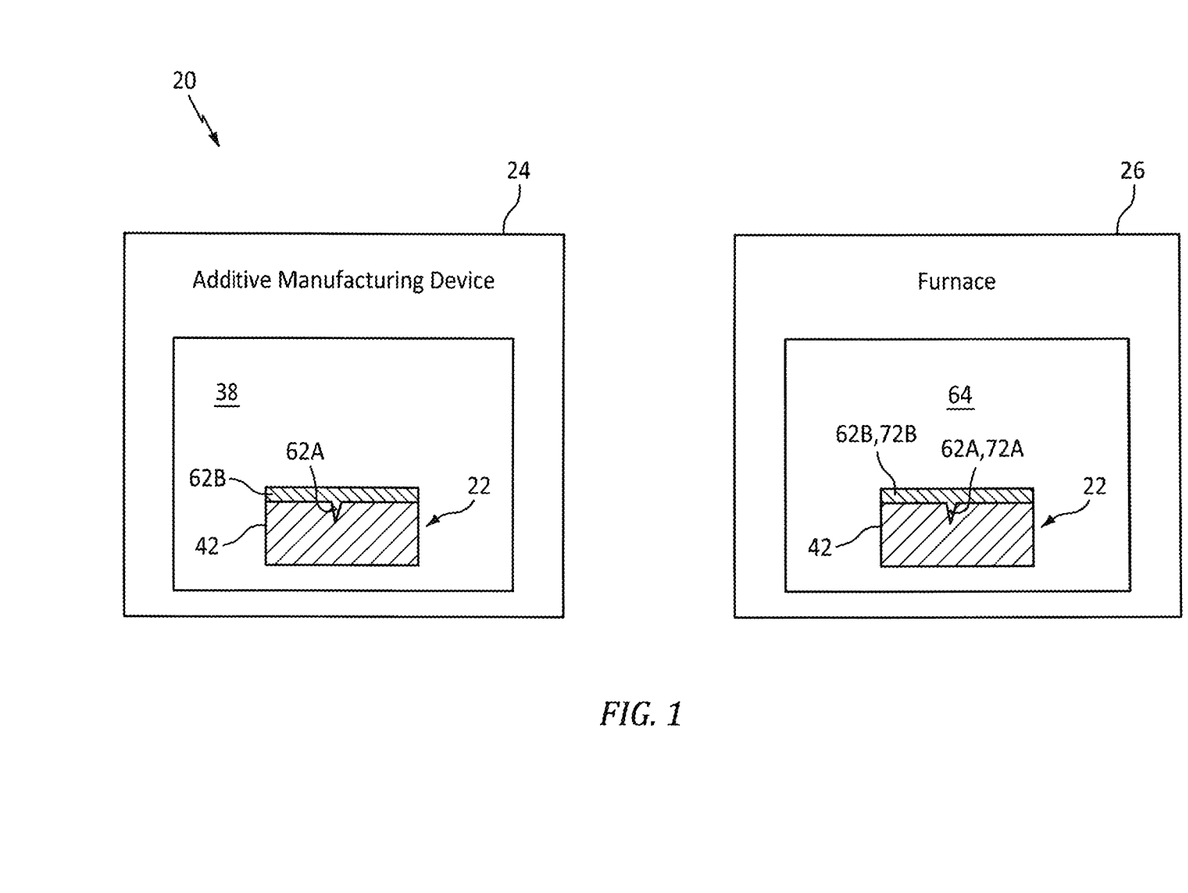
FIG. 1 is a schematic illustration of a system for manufacturing a component.

FIG. 1 schematically illustrates an exemplary system 20 for manufacturing (e.g., repairing or forming) the component 22. This manufacturing system 20 includes an additive manufacturing device 24 (e.g., a three-dimensional (3D) printer) and a furnace 26.

Figure 2:
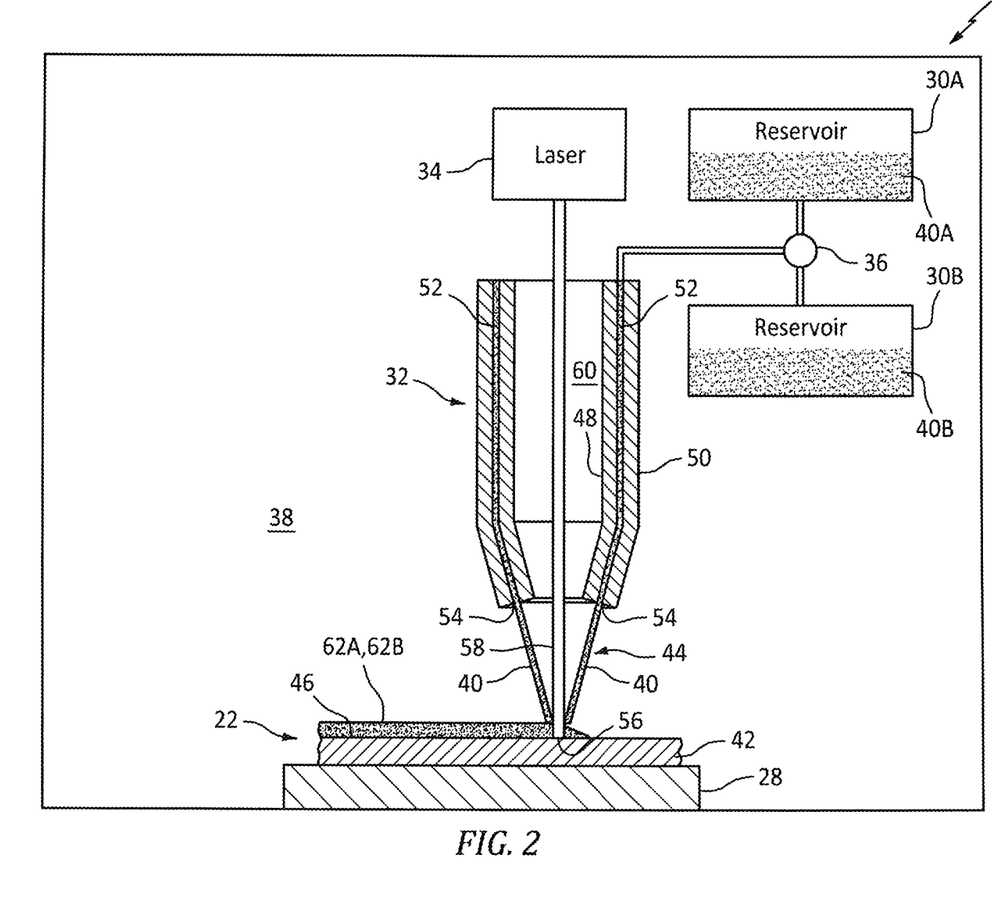
FIG. 2 is a schematic illustration of an additive manufacturing device.

Referring to FIG. 2, the additive manufacturing device 24 may be configured as a laser material deposition device. More particularly, the additive manufacturing device 24 may be configured as a direct laser braze cladding (DLBC) device. The additive manufacturing device 24 of FIG. 2, for example, includes a component support 28, one or more material reservoirs 30A and 30B (generally referred to as "30"), at least (or only) one nozzle 32, and at least (or only) one laser 34. The additive manufacturing device 24 of FIG. 2 also includes a material regulation device 36.

The component support 28 is located within an internal build chamber 38 of the additive manufacturing device 24. This component support 28 is configured to support the component 22 within the build chamber 38. The component 22, for example, may be placed on top of the component support 28. The component 22 may also or alternatively be mounted to the component support 28 via a fixture, which fixture may arrange the component 22 in a fixed position and/or in a known spatial orientation within the build chamber 38.

The first material reservoir 30A is configured to store a quantity of first braze powder 40A formed from first braze material. This first material reservoir 30A is also configured to supply the first braze powder 40A to the nozzle 32 (e.g., through the material regulation device 36) during select additive manufacturing device operations. Examples of the first material reservoir 30A include, but are not limited to, a tank, a hopper and a bin.

The second material reservoir 30B is configured to store a quantity of second braze powder 40B formed from second braze material. This second material reservoir 30B is also configured to supply the second braze powder 40B to the nozzle 32 (e.g., through the material regulation device 36) during select additive manufacturing device operations. Examples of the second material reservoir 30B include, but are not limited to, a tank, a hopper and a bin.

The material regulation device 36 is fluidly coupled with and between the material reservoirs 30 and the nozzle 32. The material regulation device 36 is configured to selectively direct the first braze powder 40A from the first material reservoir 30A to the nozzle 32 during a first mode. The material regulation device 36 is configured to selectively direct the second braze powder 40B from the second material reservoir 30B to the nozzle 32 during a second mode. The material regulation device 36 may also (or may not) be configured to selectively direct one or more combinations of the first braze powder 40A from the first material reservoir 30A and the second braze powder 40B from the second material reservoir 30B to the nozzle 32 during a third mode. Examples of the material regulation device 36 include, but are not limited to, a valve or valves, a pump or pumps, a powder wheel or wheels, an auger or augers, and a powder metering wheel or wheels.

The nozzle 32 is configured to deliver the first braze powder 40A received from the first material reservoir 30A, the second braze powder 40B received from the second material reservoir 30B or a combination of the first braze powder 40A and the second braze powder 40B to a substrate 42 of the component 22 during additive manufacturing device operation. More particularly, the nozzle 32 is configured to direct a (e.g., annular, conical) stream 44 of the braze powder 40A and/or 40B (generally referred to as "40") toward (e.g., to) a surface 46 of the substrate 42. The nozzle 32 of FIG. 2, for example, includes a tubular inner sidewall 48 and a tubular outer sidewall 50. The outer sidewall 50 extends axially along and circumscribes the inner sidewall 48 so as to form a passage 52 (e.g., an annulus) between the inner sidewall 48 and the outer sidewall 50. This passage 52 is fluidly coupled with outlets from the material reservoirs 30 through the material flow regulator 36, and the passage 52 extends axially within the nozzle 32 to a (e.g., annular) nozzle orifice 54. A distal end portion of the nozzle 32 and its inner sidewall 48 and its outer sidewall 50 may radially taper inwards as the nozzle 32 extends axially toward (e.g., to) the nozzle orifice 54. With such an arrangement, the nozzle 32 may focus the braze powder 40 to, around or about a target point 56 on, slightly above or slightly below the substrate surface 46. However, in alternative embodiments, the nozzle 32 may be configured to deliver the braze powder 40 through an internal bore rather than an annulus.

The laser 34 is configured to generate a laser beam 58 for sintering the braze powder 40 delivered by the nozzle 32 together and to the substrate 42. Herein, the term "sintering" may describe a process for coalescing powder particles together into a (e.g., porous) mass by heating without (e.g., partial or complete) liquification of the powder. This is in contrast to, for example, a powder laser welding process where powder is melted to a liquid state (e.g., in a melt pool) by a laser beam and then solidified as a solid mass. The laser 34 of FIG. 2 is configured to direct the laser beam 58 to or about the target point 56, where the laser beam 58 may be incident with and is operable to heat up the braze powder 40 for sintering. The laser beam 58 of FIG. 2 is directed through an (e.g., central) internal bore 60 of the nozzle 32, which internal nozzle bore 60 may be formed by the inner sidewall 48. However, in other embodiments, the laser 34 may be configured to direct the laser beam 58 outside of the nozzle 32 or along another path through the nozzle 32.

Referring to FIG. 1, the furnace 26 is configured to receive the substrate 42 with the sintered first braze material 62A and/or the sintered second braze material 62B (generally referred to as "62") within an internal treatment chamber 64 of the furnace 26. The furnace 26 is further configured to subject the substrate 42 and the sintered braze material(s) 62 to a heat cycle, for example under vacuum and/or in a partial pressure inert gas (e.g., argon (Ar) gas) environment. During this heat cycle, the sintered braze material(s) 62 may melt and diffusion bond to the substrate 42. An example of the furnace 26 is a vacuum furnace.

Figure 3:
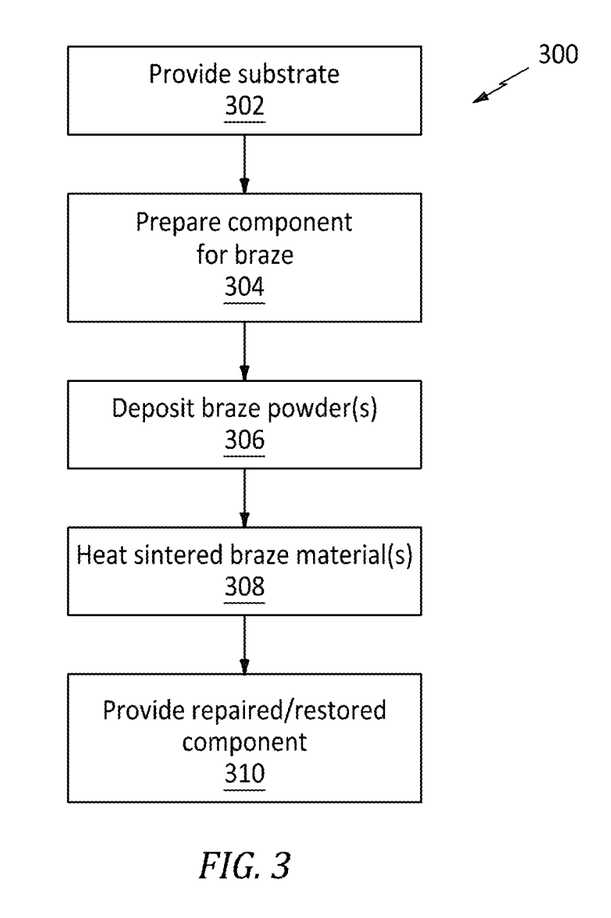
FIG. 3 is a flow diagram of a method for manufacturing the component.

FIG. 3 is a flow diagram of an exemplary method 300 for manufacturing (e.g., repairing or forming) the component 22. For ease of description, the manufacturing method 300 is described with respect to the manufacturing system 20 and repairing the component 22. The manufacturing method 300, however, is not limited to any particular manufacturing types or configurations. Furthermore, some or all of the method steps may alternatively be performed to form a new component.

Figure 4:
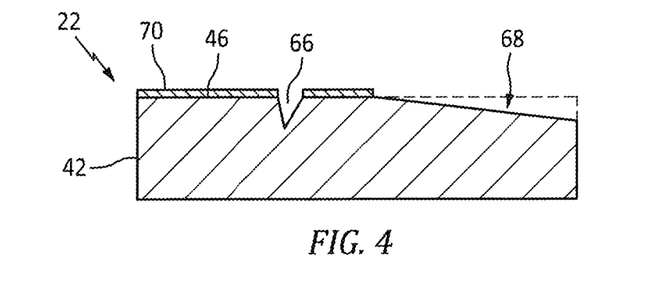
FIGS. 4-9 are partial sectional illustrations of the component during various steps of the manufacturing method.

In step 302, referring to FIG. 4, the substrate 42 is provided. For ease of description, this substrate 42 is described as part of a damaged component. For example, the component 22 of FIG. 4 includes at least one void 66 such as, but not limited to, a crack, a fracture, a slice, a gouge, a dimple, etc. This void 66 projects partially into the component 22 and its substrate 42 from an exterior of the component 22. The component 22 of FIG. 4 also include a wear region 68 where a portion of the component 22 and its substrate 42 has been worn away due to, for example, erosion, rubbing and/or otherwise. Of course, in other embodiments, the component 22 may include multiple voids 66, multiple wear regions 68, the void(s) 66 without any wear region, the wear region(s) 68 without any void, and/or one or more other substrate defects.

Figure 5:
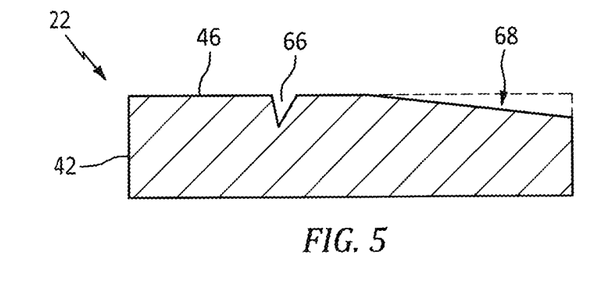

In step 304, referring to FIG. 5, the component 22 is prepared for the braze powder. A coating 70 (see FIG. 4) over at least a portion or an entirety of the substrate 42, for example, may be removed to expose the underlying substrate 42 and its substrate surface 46. The coating 70 may be removed using various techniques such as, but not limited to, chemical stripping, abrasive blasting, waterjet blasting and/or machining. The substrate surface 46 may also be prepared (e.g., treated) for braze powder deposition. Examples of such surface preparation may include, but are not limited to: fluoride ion cleaning (FIC); reverse electroplating, electroplating to introduce a more wettable interface, such as nickel (Ni); nickel honing (e.g., microblasting); acid etching; and/or wet abrasive honing. Fluoride ion cleaning (FIC) may be particularly useful for removing oxides from deep within tips of narrow cracks, which may facilitate subsequent deep penetration of braze into the cracks for (e.g., complete) healing of the cracks.

Figure 6:
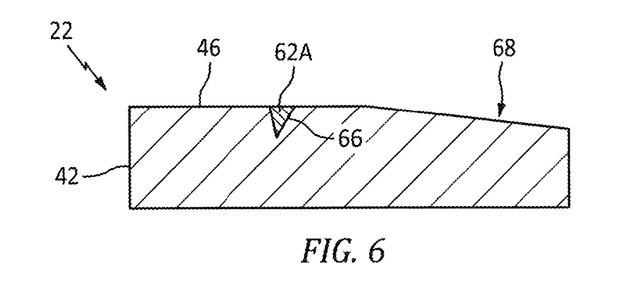
Figure 7:
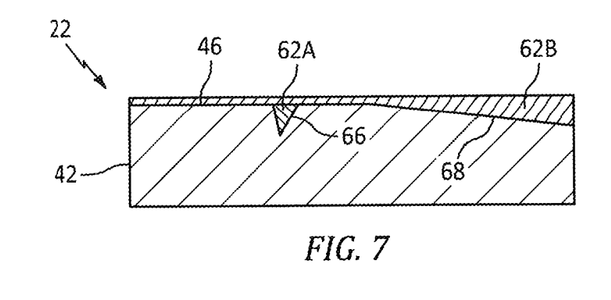

In step 306, referring to FIGS. 2, 6 and 7, the first braze powder and/or the second braze powder are selectively deposited with the substrate 42 using the additive manufacturing device 24. The first braze powder 40A, for example, may be deposited with the substrate 42 to repair a first type of substrate defect such as, but not limited to, the void 66 in the substrate 42 of FIG. 6. The second braze powder 40B, by contrast, may be deposited with the substrate 42 to repair a second type of substrate defect (different than the first type of substrate defect) such as, but not limited to, the wear region 68 of FIG. 7. More particularly, the first braze powder 40A may be provided (e.g., selected, formulated, etc.) for increased wettability, flowability and/or capillary penetration. The first braze powder may thereby be particularly suited for entering and filling voids; e.g., see FIG. 6. The second braze powder 40B, on the other hand, may be provided (e.g., selected, formulated, etc.) for improved dimensional repair of the surface due to lower wettability and flowability. The second braze powder may thereby be particularly suited for forming claddings; e.g., see FIG. 7. Of course, it is contemplated the first braze powder 40A and the second braze powder 40B may be mixed together in some proportion to provide a combined braze powder with intermediate braze properties.

The first braze powder 40A may include a mixture of metal alloy powder (e.g., substrate powder) and braze material powder. The metal alloy powder may be selected to have a relatively high melting point and common (the same) or similar material properties as the substrate 42. The metal alloy powder, for example, may be made from a common (or a similar) material as the underlying substrate 42; e.g., an aluminum (Al) superalloy, a nickel (Ni) superalloy, a titanium (Ti) superalloy, etc. The braze material powder, on the other hand, may be selected to have a relatively low melting point, which is lower than the melting point of the metal alloy powder. The braze material powder, for example, may include a common or similar base element as the substrate 36 and/or the metal alloy powder (e.g., aluminum (Al), nickel (Ni) or titanium (Ti)) without the super alloying elements. The brazing powder may also include boron (B), silicon (Si) and/or other melting point suppressants which may help facilitate melting and diffusion of the metal alloy powder with the substrate 36. The present disclosure, however, is not limited to the foregoing exemplary braze materials.

The second braze powder 40B may include a mixture of the metal alloy powder (e.g., substrate powder) and the braze material powder. A ratio of the metal alloy powder to the braze material powder in the second braze powder 40B may be greater than a ratio of the metal alloy powder to the braze material powder in the first braze powder 40A. For example, the second braze powder 40B may include lower proportions of the metal alloy powder relative to the braze material powder (e.g., 30/70). By contrast, the first braze powder 40A may include higher proportions of the metal alloy powder relative to the braze material powder (e.g., 60/40). The present disclosure, however, is not limited to the foregoing exemplary braze powder makeups. For example, in other embodiments, one or more or all of the constituent materials in the first braze powder may be different that one or more or all of the constituent materials in the second braze powder.

During the braze powder deposition, the additive manufacturing device 24 of FIG. 2 may dispose the respective braze powder 40 onto the substrate 42 at or about the target point 56. The laser 34 may concurrently sinter this respective braze powder 40 at the target point 56 together and/or to the underlying substrate 42. Referring to FIG. 6, the additive manufacturing device 24 may be positioned and operated to provide the sintered first braze material 62A within the void 66; e.g., to partially or completely fill the void 66. Referring to FIG. 7, the additive manufacturing device 24 may be positioned and operated to provide a cladding (e.g., a layer or multiple layers) of the sintered second braze material 62B over the wear region 68; e.g., to build back worn away substrate material. The additive manufacturing device 24 may also or alternatively be positioned and operated to provide a cladding (e.g., a layer or multiple layers) of the sintered second braze material 62B over the sintered first braze material 62A and/or one or more other (e.g., adjacent) regions of the substrate 42.

The additive manufacturing device 24 may selectively deposit the first braze powder and/or the second braze powder over the substrate 42 such that (e.g., only) areas which need repair (and optionally areas adjacent and/or surrounding those areas) are filled with the sintered first braze material 62A and/or coated with the sintered second braze material 62B. Of course, in other embodiments, the first braze powder and/or the second braze powder may be deposited over an entirety of the substrate 42 where excess material may later be removed. The first braze powder and/or the second braze powder may be deposited (e.g., built up) as one or more layers during the step 306.

Figure 8:
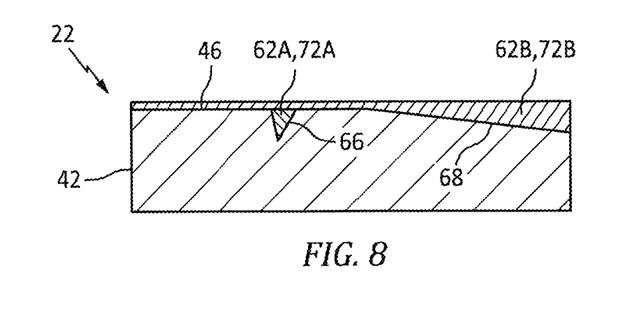

In step 308, referring to FIG. 8, the substrate 42 and the sintered braze material(s) 62 are heated. The substrate 42 with the sintered braze material(s) 62, for example, may be arranged within the treatment chamber 64 of the furnace 26 of FIG. 1. The furnace 26 may subject the substrate 42 with the sintered braze material(s) 62 to a heat cycle. More particularly, the substrate 42 with the sintered braze material(s) 62 may be heated to an elevated temperature within a partial pressure inert gas environment. The elevated temperature is selected such that the sintered braze material(s) 62 melts, wets and flows into defects of the substrate 42 by capillary action. Once the sintered braze material has melted, a relatively lower temperature may be selected and held in the same heat cycle for a duration. This sustained temperature may facilitate diffusion of the melting point suppressant material. This diffusion of the melting point suppressant material may facilitate athermal solidification, resulting in a braze diffusion bond of the sintered material to the substrate 42. The athermal solidification may describe solidification of the melted sintered braze material under, for example, a constant temperature. The diffusion duration may be between four (4) hours and twelve (12) hours, but may be much shorter or longer depending on materials being diffusion brazed and/or desired material properties. This elevated temperature, however, is less than a melting point temperature of the substrate material. The elevated temperature for the braze melt, for example, may be between 1,500° F. and 2,500° F. The elevated temperature for the braze diffusion, for example, may be between 1,000° F. and 2,400° F. The inert gas environment may have a vacuum pressure range between, for example, 0.5 microns and 0.1 microns. The present disclosure, however, is not limited to the foregoing exemplary heat cycle parameters, and the foregoing heat cycle parameters may vary depending upon the specific material composition of the substrate 42 and the braze material, dimensions (e.g., thickness) of the sintered braze material(s) 62, etc.

Following the heating step 308, first braze filler material 72A (e.g., the melted and diffusion bonded first braze material) of FIG. 8 may heal the void 66. The first braze filler material 72A, for example, may partially or completely fill the void 66. The second braze filler material 72B may provide a cladding over the substrate 42 to restore a dimensional parameter of and/or reinforce the wear region 68 and/or other regions. Second braze filler material 72B (e.g., the melted and diffusion bonded second braze material), for example, may buildup the wear region 68 back to or above a dimensional parameter specified therefor by a design specification or a repair specification for the component 22.

Figure 9:
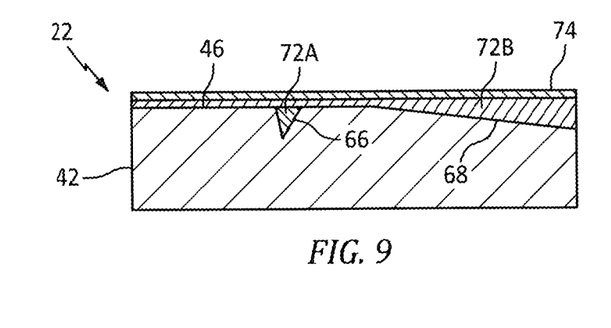

In step 310, referring to FIG. 9, the substrate 42 with the braze filler material(s) 72A and 72B (generally referred to as "72") may be processed (e.g., post-braze processed) to provide a repaired/restored component. Excess braze filler material(s), for example, may be removed, the substrate material and/or the braze filler material(s) may be finished (e.g., sanded, polished, etc.), and/or one or more coatings 74 (e.g., bond coating(s), environmental coating(s), thermal barrier coating(s), etc.) may be applied to the substrate 42 and/or the braze filler material(s) 72.

In some embodiments, referring to FIG. 2, the respective braze powder 40 and the laser beam 58 may be concurrently directed to the common target point 56 for the braze powder deposition. In other embodiments, however, the laser beam 58 may alternatively be directed to a different target point than the respective braze powder 40. The laser beam target point, for example, may alternatively be spaced from and follow the braze powder target point.

In some embodiments, the respective braze powder 40 may be sintered using the laser beam 58. The present disclosure, however, is not limited to use of such an exemplary energy beam. The respective braze powder, for example, may alternatively be sintered using an electron beam provided by an electron beam source. Furthermore, multiple energy beams (e.g., laser beams and/or electron beams) may be used for sintering the respective braze powder 40. In addition or alternatively, multiple nozzles 32 may be used to delivery the braze powders 40A and 40B.

A component manufactured using a typical additive laser deposition welding process may be subject to: internal stresses thermally induced by relatively high welding temperatures (e.g., temperatures high enough to melt the substrate material); thermally induced distortion and/or warping; and/or reduction in material density caused by, for example, dendritic voids. By contrast, sintering the braze powder(s) 40A and/or 40B with the substrate 42 and then diffusion bonding the sintered braze material(s) with the substrate 42 as described above subjects the substrate 42 to relatively low processing temperatures, compared to welding temperatures. The manufacturing methods of the present disclosure may thereby reduce or eliminate: thermally induced stresses; thermally induced distortion and/or warping; and/or reduction in material density associated with additive laser deposition welding techniques. The above laser braze cladding technique may also be paired with adaptive processing to reduce material consumption and/or require less post processing (e.g., machining, finishing, etc.) compared to traditional manual brazing techniques.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method, comprising:
depositing first braze powder with a substrate, the first braze powder comprising a metal alloy powder and a first braze material powder with a lower melting point than the metal alloy powder, the first braze material powder comprising a melting point suppressant to facilitate melting and diffusion of the first braze powder with the substrate, the first braze powder sintered to the substrate during the depositing of the first braze powder to provide the substrate with sintered first braze material;
depositing second braze powder with the substrate, the second braze powder different than the first braze powder and the second braze powder sintered to the substrate during the depositing of the second braze powder to provide the substrate with sintered second braze material; and
heating the sintered first braze material and the sintered second braze material to melt the sintered first braze material and the sintered second braze material and to diffusion bond the sintered first braze material and the sintered second braze material to the substrate;
wherein the second braze powder comprises second metal alloy powder and second braze material powder, the second braze material powder comprising the melting point suppressant to facilitate melting and diffusion of the second braze powder with the substrate.

2. The method of claim 1, wherein
the first braze powder is deposited with the substrate to fill a void in the substrate; and
the second braze powder is deposited with the substrate to form a cladding on the substrate.

3. The method of claim 1, wherein
the first braze powder is deposited with the substrate to repair a first type of defect of the substrate; and
the second braze powder is deposited with the substrate to repair a second type of defect of the substrate that is different than the first type of defect.

4. The method of claim 1, wherein
the first braze powder has a first ratio of the metal alloy powder to the first braze material powder; and
the second braze powder comprises the metal alloy powder and second braze material powder, the second braze powder has a second ratio of the metal alloy powder to the second braze material powder, and the second ratio is different than the first ratio.

5. The method of claim 4, wherein
the first braze powder is deposited with the substrate to fill a void in the substrate;
the second braze powder is deposited with the substrate to form a cladding on the substrate; and
the second ratio is greater than the first ratio.

6. The method of claim 1, wherein the metal alloy powder and the substrate comprise a common metal alloy.

7. The method of claim 1, wherein the first braze powder and the second braze powder are deposited with the substrate using an additive manufacturing device.

8. The method of claim 7, wherein the depositing of the first braze powder includes
directing the first braze powder towards the substrate through a nozzle; and
sintering the first braze powder using a laser beam.

9. The method of claim 8, wherein the depositing of the second braze powder includes
directing the second braze powder towards the substrate through the nozzle; and
sintering the second braze powder using the laser beam.

10. The method of claim 9, further comprising:
selectively directing the first braze powder from a first reservoir to the nozzle during the depositing of the first braze powder; and
selectively directing the second braze powder from a second reservoir to the nozzle during the depositing of the second braze powder.

11. The method of claim 8, wherein the laser beam is directed towards the substrate through an inner bore of the nozzle.

12. The method of claim 1, wherein
a laser beam sinters the first braze powder to the substrate as the first braze powder is deposited with the substrate; and
the laser beam sinters the second braze powder to the substrate as the second braze powder is deposited with the substrate.

13. The method of claim 1, wherein the heating of the sintered first braze material and the sintered second braze material is performed in a vacuum furnace subsequent to the depositing of the first braze powder and the second braze powder.

14. The method of claim 1, wherein the substrate is part of a stationary component of a gas turbine engine.

15. A method, comprising:
providing an additive manufacturing device including a first reservoir and a second reservoir, the first reservoir containing first braze powder, and the second reservoir containing second braze powder that is different than the first braze powder;

depositing the first braze powder with a substrate using the additive manufacturing device, wherein the first braze powder is sintered to the substrate during the depositing of the first braze powder to provide the substrate with sintered first braze material;

depositing the second braze powder with the substrate using the additive manufacturing device, wherein the second braze powder is sintered to the substrate during the depositing of the second braze powder to provide the substrate with sintered second braze material; and heating the sintered first braze material and the sintered second braze material in a vacuum furnace to melt, wet, and flow the sintered first braze material and the sintered second braze material into at least one defect of the substrate by capillary action, and to diffusion bond the sintered first braze material and the sintered second braze material to the substrate.

16. The method of claim 15, wherein
the additive manufacturing device further includes a nozzle;
the first braze powder is directed from the first reservoir, through the nozzle, to the substrate during the depositing of the first braze powder; and
the second braze powder is directed from the second reservoir, through the nozzle, to the substrate during the depositing of the second braze powder.

17. The method of claim 15, wherein
the sintered first braze material fills a void in the substrate; and
the sintered second braze material forms a cladding on the substrate.

18. The method of claim 1, wherein the melting point suppressant comprises at least one of boron and silicon.

* * * * *